(12) United States Patent
Zeaton et al.

(10) Patent No.: US 8,875,520 B2
(45) Date of Patent: Nov. 4, 2014

(54) GAS TURBINE ENGINE DEVICE

(75) Inventors: Gregory W. P. Zeaton, Indianapolis, IN (US); David L. Sutterfield, Greenwood, IN (US); Sean F. Sullivan, Tremonton, UT (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 886 days.

(21) Appl. No.: 12/634,606

(22) Filed: Dec. 9, 2009

(65) Prior Publication Data
US 2010/0162725 A1 Jul. 1, 2010

Related U.S. Application Data

(60) Provisional application No. 61/204,038, filed on Dec. 31, 2008.

(51) Int. Cl.
| | | |
|---|---|---|
| *F02C 7/20* | (2006.01) | |
| *F02K 1/80* | (2006.01) | |
| *F02K 1/04* | (2006.01) | |
| *F02K 1/08* | (2006.01) | |

(52) U.S. Cl.
CPC ... *F02K 1/80* (2013.01); *F02K 1/04* (2013.01); *F02K 1/08* (2013.01); *Y02T 50/67* (2013.01); *Y02T 50/672* (2013.01); *F05D 2240/14* (2013.01)
USPC .................. 60/796; 60/797; 60/798; 60/799; 60/800; 60/772

(58) Field of Classification Search
USPC .......... 60/796–800, 226.1, 226.2, 226.3, 806, 60/262, 770, 771; 415/115; 239/265.19, 239/265.29
See application file for complete search history.

(56) References Cited

U.S. PATENT DOCUMENTS

| | | | |
|---|---|---|---|
| 2,710,523 A * | 6/1955 | Purvis ............................ | 60/770 |
| 4,989,406 A * | 2/1991 | Vdoviak et al. ................ | 60/762 |
| 5,400,586 A | 3/1995 | Bagepalli et al. | |
| 5,524,846 A * | 6/1996 | Shine et al. ................. | 244/53 R |
| 6,240,720 B1 | 6/2001 | Tseng et al. | |
| 6,895,761 B2 | 5/2005 | Mitchell et al. | |
| 7,419,121 B2 * | 9/2008 | Williams ........................ | 244/54 |
| 2005/0204746 A1 * | 9/2005 | Chereau et al. ................ | 60/796 |
| 2006/0010879 A1 | 1/2006 | Aumont et al. | |
| 2006/0032237 A1 | 2/2006 | Aumont et al. | |
| 2006/0123797 A1 | 6/2006 | Zborovsky et al. | |
| 2008/0060344 A1 * | 3/2008 | Durocher et al. .............. | 60/262 |
| 2008/0104941 A1 * | 5/2008 | Blanchard et al. ............. | 60/272 |
| 2008/0148737 A1 * | 6/2008 | Ellis et al. ...................... | 60/796 |

\* cited by examiner

*Primary Examiner* — Craig Kim
(74) *Attorney, Agent, or Firm* — Krieg DeVault LLP

(57) ABSTRACT

A gas turbine engine adapter is provided. In one form the adapter is segmented and may be attached to a gas turbine engine support ring. The adapter can provide a channel that may receive part of a gas turbine engine component such as, but not limited to, a plug nozzle. The adapter can include a load bearing support to counteract axial forces experienced by the plug nozzle during operation of the gas turbine engine. A compressible seal can be provided between the plug nozzle and the adapter. A leaf seal can also be provided to seal between segments of the adapter. The plug nozzle can be discouraged from rotating relative to the adapter.

19 Claims, 3 Drawing Sheets

GAS TURBINE ENGINE DEVICE

CROSS REFERENCE TO RELATED APPLICATIONS

The present application claims the benefit of U.S. Provisional Patent Application 61/204,038, filed Dec. 31, 2008, and is incorporated herein by reference.

GOVERNMENT RIGHTS

The present application was made with the United States government support under Contract No. N00014-04-D-0068, awarded by the United States Navy. The United States government has certain rights in the present application.

FIELD OF THE INVENTION

The present invention generally relates to gas turbine engines, and more particularly, but not exclusively, to adapting components within a gas turbine engine.

BACKGROUND

Gas turbine engines include a number of components. Some components may operate in different thermal regions and/or may have different structural or thermo-structural characteristics. Reliably attaching gas turbine engine components together while ensuring suitable operational characteristics remains an area of interest. Unfortunately, some existing systems have various shortcomings relative to certain applications. Accordingly, there remains a need for further contributions in this area of technology.

SUMMARY

One embodiment of the present invention is a unique adapter for a gas turbine engine. Other embodiments include apparatuses, systems, devices, hardware, methods, and combinations for adapting a propulsion component to a gas turbine engine structure. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
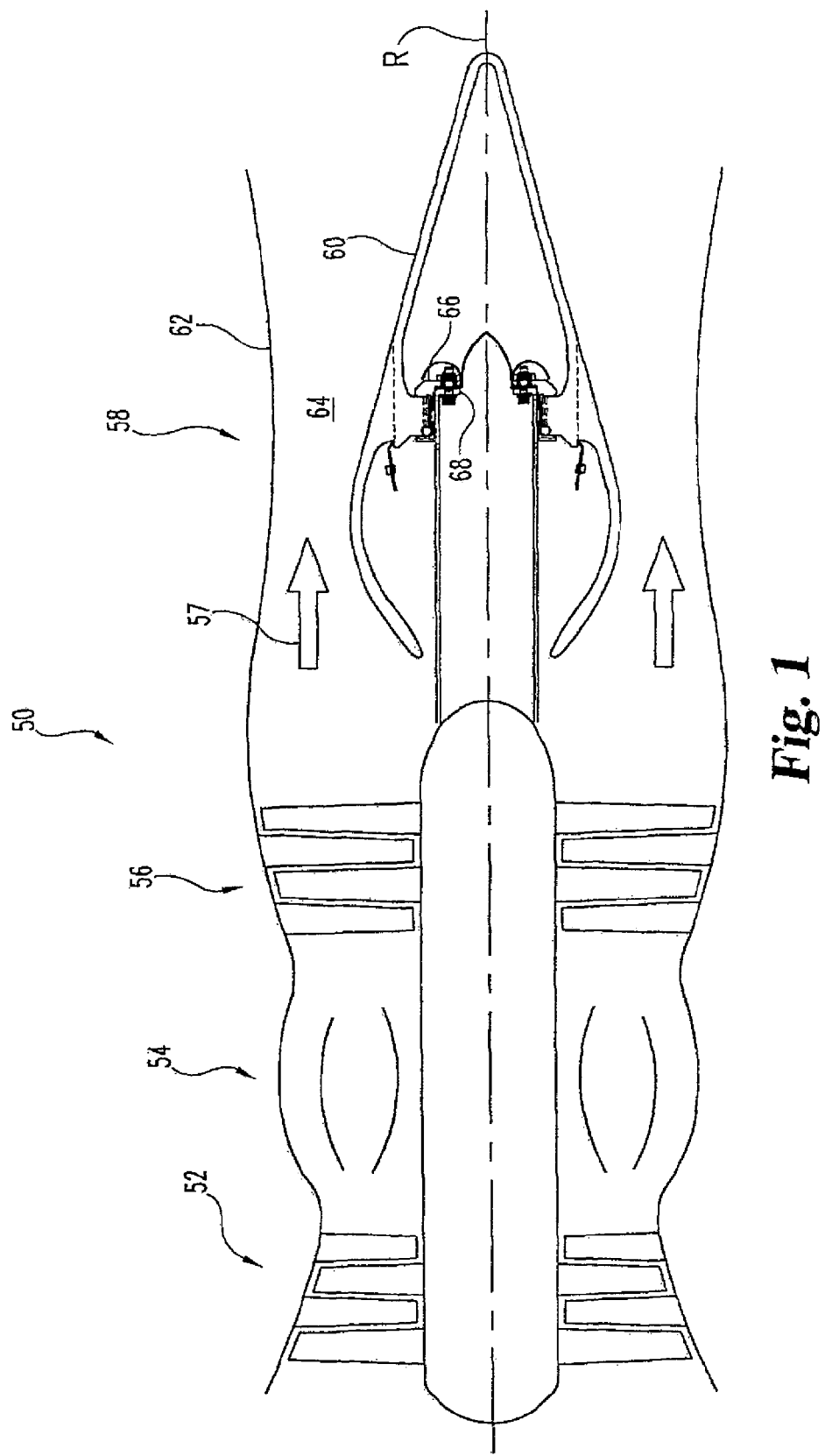
FIG. 1 is a partial cross-sectional view of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 suitable for producing power for an aircraft is shown. As used herein, the term "aircraft" includes, but is not limited to, airplanes, unmanned space vehicles, fixed wing vehicles, variable wing vehicles, unmanned autonomous aircraft, and others.

In one form the gas turbine engine 50 includes a compressor 52, a combustor 54, a turbine 56, and an exhaust nozzle 58. The gas turbine engine 50 operates by compressing air with the compressor 52, mixing fuel with the compressed air, combusting the mixture within the combustor 54, and extracting power from the combusted mixture through the turbine 56. An exhaust stream 57 exits the turbine 56 and is at least partially received by the exhaust nozzle 58. In one form the exhaust nozzle 58 includes a plug nozzle 60 and a duct 62 that together form a flow path 64 for the exhaust stream 57. The plug nozzle 60 in the illustrative embodiment is attached to the gas turbine engine 50 by an adapter ring 66 which is further connected to a support ring 68.

The gas turbine engine 50 can take on various forms and may not be limited strictly to the turbojet configuration depicted in FIG. 1. For example, the gas turbine engine 50 can be a turbofan, ramjet, or scramjet, to set forth just a few non-limiting examples. In addition, the gas turbine engine 50 can have multiple spools and can have any number of stages within either the compressor 52 or the turbine 56.

Figure 2:
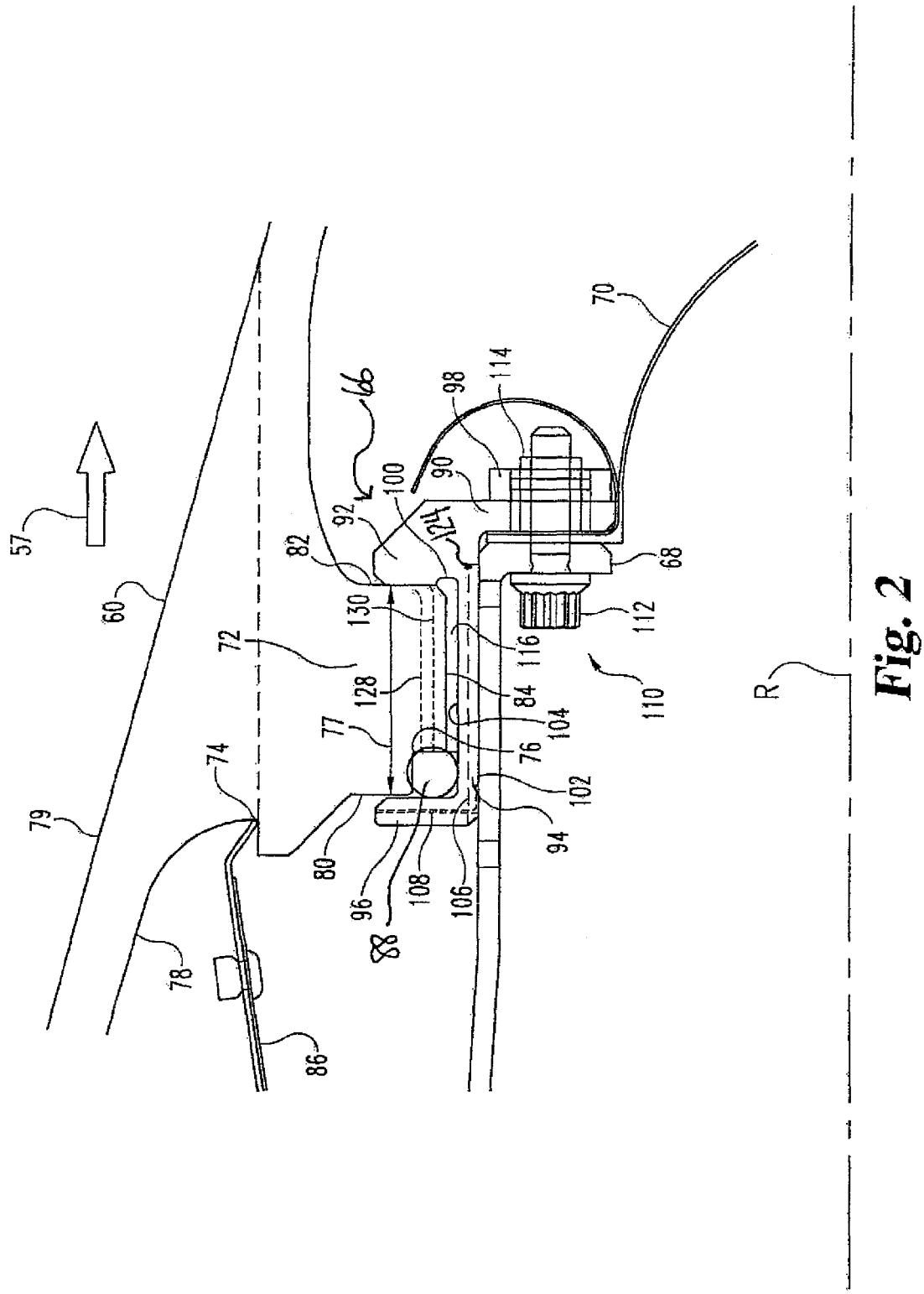
FIG. 2 is a partial cross-sectional view of one embodiment of an adapter.

With reference to FIG. 2, a partial cross-sectional view of one embodiment of the plug nozzle 60 and the adapter ring 66 is shown. A pressure dome 70 is also depicted in FIG. 2 and is attached between the adapter ring 66 and the support ring 68. In some embodiments the pressure dome may not be present. In one form, the plug nozzle 60 includes a lug 72, a notch 74, and a cutout 76. The plug nozzle 60 is depicted as axisymmetric in the illustrative embodiment and can be constructed as a carbon-carbon composite structure. In other embodiments, the plug nozzle 60 may not be axisymmetric. Furthermore, the plug nozzle 60 can be constructed from a variety of other materials in other embodiments. The plug nozzle 60 can include a plug nozzle inner surface 78 and a plug nozzle outer surface 79 which is exposed to the exhaust stream 57.

In one form the lug 72 includes an upstream side 80, a downstream side 82, and an end 84 and extends from the plug nozzle inner surface 78 around the circumferential inner periphery of the plug nozzle 60. In some embodiments, several lugs 72 can be arranged around the circumferential inner periphery of the plug nozzle 60, each separated by a distance that can be the same or can vary around the plug nozzle 60. In those embodiments having multiple lugs 72, each of the lugs 72 can have the same configuration, some can have unique configurations, or all of the lugs 72 can be unique. The lug 72 can extend to a variety of radial lengths from the plug nozzle inner surface 78 and can have a variety of axial thicknesses 77. In addition, the axial thickness 77 can vary as a function of the radial distance from the plug nozzle inner surface 78.

In the illustrative embodiment the notch 74 is formed in the plug nozzle 60 to provide an area in which to engage a gas turbine engine structure 86. In some embodiments, the gas turbine engine structure 86 provides a radially inward force to urge the lug 72 of the plug nozzle 60 into engagement with the adapter ring 66. The notch 74 can be used in some embodiments to provide support in addition to other supporting structures to secure the plug nozzle 60 to the gas turbine engine 50. The notch 74 can be any configuration suitable to engage the gas turbine engine structure 86. Some embodiments may not include a notch 74. The notch 74 extends around the circumferential inner periphery of the plug nozzle 60, but some embodiments can have multiple notches 74 that extend in segments around the inner periphery. The notches 74 can be the same size or may have unique sizes. Furthermore, the distance between notches 74 can be the same or can be different.

The cutout 76 is depicted in the illustrative embodiment as a rectangular cutout in the side view of FIG. 2. In other embodiments, however, the cutout 76 can take on any suitable form, such as, but not limited to, a circular cutout. The cutout 76 can extend circumferentially around the plug nozzle 60, but in some embodiments may only extend partially around the inner circumference of the plug nozzle 60. In some embodiments, multiple cutouts 76 can be formed which extend only partially circumferentially around the plug nozzle 60. Some embodiments may lack a cutout 76. The cutout 76 can be used together with the adapter ring 66 to secure a sealing member 88 in place to prevent, reduce, or mitigate passage of high pressure air between the upstream side 80 and the downstream side 82 of the lug 72. In one form, the sealing member 88 is a ceramic rope. During operation under thermal and mechanical stresses, the sealing member 88 can compress as the adapter ring 66 and the plug nozzle 60 move relative to each other.

In some embodiments, the cutout 76 can be alternatively formed. In one embodiment, the cutout 76 can be formed within the end 84 of the lug 72 such that the sealing member 88 is not exposed to an upstream wall 96 but rather is disposed within the cutout 76 between the lug 72 and a base 94 of the adapter ring 66. In another embodiment, the cutout 76 can be formed in the base 94, and the end 84 of the lug 72 can be substantially flat. In still further embodiments, the cutout 76 can be formed between both the base 94 and the lug 72.

In one form the adapter ring 66 includes a flange 90, a downstream wall 92, the base 94, and the upstream wall 96. In one form the adapter ring 66 is metallic, but other types of materials may also be used in other embodiments. The flange 90 is used in the illustrated embodiment to mount the adapter ring 66 to the support ring 68. In one embodiment, the downstream wall 92 is coated with a thermal barrier coating allowing the lug 72 to operate at temperatures of 2000° F. or greater. The flange 90 can include an aperture for passing a fastener such as a bolt, and can also include a member 98 for retaining part of the fastener. In some embodiments, the flange 90 can have threaded apertures to accommodate key-locked, self-locking inserts. In one form, the member is a nut retainer which can be used to position a nut to receive a bolt or to clamp a nut so that it does not move when a bolt is threaded through the aperture of the flange 90. The flange 90 can have any variety of sizes. In one form, the flange 90 is oriented at a right angle to an engine axis R, but in other forms can be oriented at any arbitrary angle.

In one form, the downstream wall 92 provides an abutment surface for the downstream side 82 of the lug 72. The downstream wall 92 can have any variety of dimensions suitable for a variety of purposes which can include, but not be limited to, positioning the downstream side 82 and providing a surface that supports any loads transmitted through the plug nozzle 60 from the passing exhaust stream 57. The downstream wall 92 includes a channel 100 formed at the bottom of the downstream wall 92. The downstream wall 92 can be chamfered or beveled at its radially outer end, as is depicted in an axial upstream and an axial downstream side of the radially outer end in FIG. 2. Other types of smoothing or transitions are also fully contemplated herein. Some embodiments may not have chamfered or beveled edges.

The base 94 extends between the downstream wall 92 and the upstream wall 96. The base 94 can extend a sufficient distance to receive the lug 72 of the plug nozzle 60. In other embodiments, however, the base 94 can extend other distances. In one form, the base 94 extends parallel to the engine axis R, but can extend at a non-parallel angle relative to the engine axis R in other embodiments. The base 94 can have a variety of thicknesses. The base 94 includes a radial inner surface 102 and a radial outer surface 104. The radial inner surface 102 can include several cooling channels 106 which will be described further hereinbelow. In some embodiments, however, the cooling channels 106 may not be included.

The upstream wall 96 can form part of a channel to receive the lug 72 of the plug nozzle 60. In one form, the upstream wall 96 is oriented perpendicular to the engine axis R, but can be oriented at an angle to the engine axis R in other embodiments. In addition, the upstream wall 96 may not be present in all embodiments. The upstream wall 96 can include an aperture 108 that opens at a radial outer end of the upstream wall 96. In some embodiments, the aperture 108 can open at other locations in the upstream wall 96. In still further embodiments, the aperture 108 can be formed in other locations of the adapter ring 66. For example, the aperture 108 can be formed in the base 94. The aperture 108 can be used to receive a sealing member 88 that can be used to prevent, reduce, or mitigate the passage of high pressure air from one side of the upstream wall 96 to the other side. Further details of the sealing member 88 are described further hereinbelow. In one form, the sealing member can be a leaf seal. Other types of sealers are also contemplated herein.

In one form, the base 94, the upstream wall 96, and the downstream wall 92 form a C-shaped channel that is used to receive the lug 72 of the plug nozzle 60. In other embodiments, the base 94, the upstream wall 96, and the downstream wall 92 form a U-shaped channel.

A fastener 110 is used to secure the adapter ring 66 to the support ring 68. In one form, the fastener includes a bolt 112 and a nut 114, but other techniques of fastening the adapter ring 66 to the support ring 68 are also contemplated here. For example, in some embodiments the adapter ring 66 can be pinned, riveted, or welded to the support ring 68, to set forth just a few non-limiting examples.

A gap 116 can be formed between the adapter ring 66 and the lug 72 of the plug nozzle 60. During operation of the gas turbine engine 50 as the plug nozzle 60 and the adapter ring 66 are heated, the gap 116 between the end 84 of the lug 72 and the base 94 of the adapter ring 66 can shrink and the sealing member 88 can be compressed between the plug nozzle 60 and the adapter ring 66.

Figure 3:
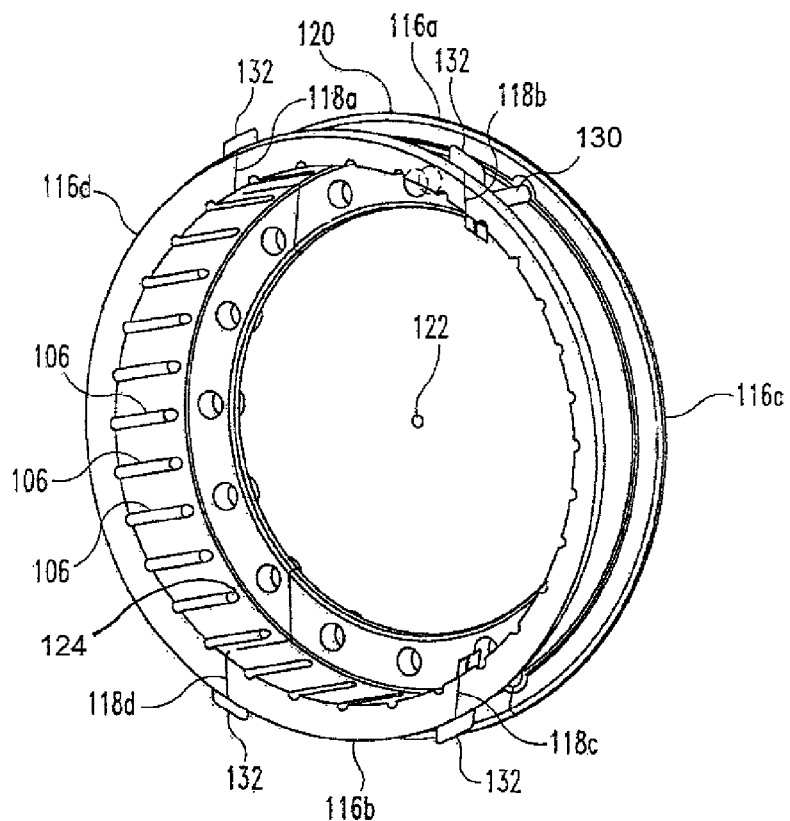
FIG. 3 is a perspective view of one embodiment of an adapter.
Figure 4:
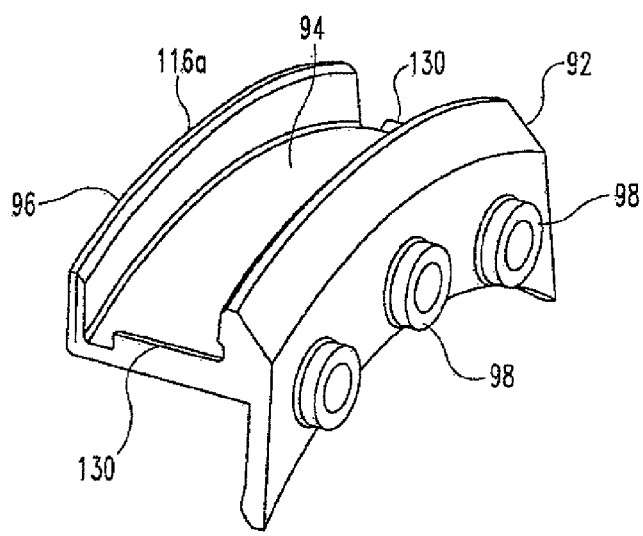
FIG. 4 is a perspective view of one embodiment of a segment of an adapter.

Turning now to FIGS. 3 and 4, with continuing reference to FIG. 2, a perspective view of the adapter ring 66 is shown. The adapter ring 66 is depicted in this embodiment as an annular device having multiple segments 116a, 116b, 116c, and 116d. The segments 116a and 116b are the same size and are smaller than the segments 116c and 116d. Though four segments 116a, 116b, 116c, and 116d are depicted in FIG. 3, other embodiments of the adapter ring 66 may include fewer or more segments. Additionally, some embodiments can provide unique segments such that no two segments are the same size. Multiple cuts or boundaries 118a, 118b, 118c, and 118d may be formed in the adapter ring 66 to mark the transition from one segment to another. The boundaries 118a, 118b, 118c, and 118d are formed as a straight line and are parallel to a line drawn from a center 120 of the smaller segments 116a and 116b to a center 122 of the circular shape of the adapter ring 66. The boundaries or cuts 118a, 118b, 118c, and 118d can take on other shapes in different embodiments. For example, the boundaries 118a, 118b, 118c, and 118d can be formed at a variety of angles such that one or more segments can be slid into place that can include movements such as either from the inside of the adapter ring 66 to the outside, or alternatively from the outside to the inside. In any event, the cuts 118a, 118b, 118c, and 118d are intended to allow easy insertion of at least one of the smaller segments. For example, the cuts allow for the adapter ring 66 to be assembled in a tight space that may preclude installation of the adapter ring 66 as an assembled whole, but that may allow installation when the adapter ring 66 is installed in separate segments. In one form during assembly, the final segment to be installed to complete the adapter ring 66 may be referred to as a keystone segment. The segments 116a and 116b of the illustrative embodiment are the keystone segments.

Each segment of the adapter ring 66 can have any number of apertures capable of receiving a bolt so that the segments may be attached to the support ring 68. In the illustrative embodiment, the segments 116a and 116b have provisions for three bolts, while the segments 116c and 116d have provisions for five bolts.

The cooling channels 106 disclosed in FIG. 2 may be seen in perspective in FIG. 3. The cooling channels 106 are formed in the radial inner surface 102 of the adapter ring 66 and extend from the axial upstream side of the upstream wall 96 to a point 124 interior to the downstream wall 92. In other embodiments, the cooling channels 106 may not extend to an interior point of the downstream wall 92. In some embodiments, the cooling channels 106 may not be included. Some cooling channels 106, furthermore, can have unique sizes, including the depth formed into the base 94 and the distance that the cooling channels 106 extend. The cooling channels 106 are formed parallel to the engine axis R, but in some embodiments can be formed at angles relative to the engine axis R.

The adapter ring 66 includes anti-rotation features 130 which operate in cooperation with a registration surface 128 formed within the plug nozzle 60. The anti-rotation features 130 have complementary shapes to the registration surface 128. When the plug nozzle 60 and the adapter ring 66 are heated during operation, the anti-rotation features 130 and the registration surface 128 can thermally grow toward one another to prevent the rotation of the plug nozzle 60 relative to the adapter ring 66. Any number of anti-rotation features 130 and the corresponding registration surfaces 128 can be formed in the adapter ring 66 and the plug nozzle 60, respectively. Not all segments 116a, 116b, 116c, and 116d need have the anti-rotation features 130. In some embodiments, the anti-rotation features 130 and the registration surfaces 128 may not be equal in number. Though the anti-rotation features 130 protrude from the adapter ring 66 and the registration surface 128 is formed as a depression in the plug nozzle 60, some embodiments can include one or more anti-rotation features 130 and the registration surfaces 128 that have the opposite relationship. For example, some embodiments can include one or more anti-rotation features 130 formed as depressions with the corresponding registration surface 128 formed as a protrusion.

Adapter sealer 132 can be seen in FIG. 3 inserted at the cuts 118a, 118b, 118c, and 118d. In the illustrative embodiment, the adapter sealer 132 takes the form of leaf seals. The adapter sealer 132 can extend the entire depth of the aperture 108 and may be secured through a friction fit. The adapter sealer 132 can be attached to the adapter ring 66 using other techniques as well. Some embodiments may not include the adapter sealer 132. The adapter sealer 132 can be received into the apertures 108 and can be used to span the cuts 118a, 118b, 118c, and 118d between the segments 116a, 116b, 116c, and 116d.

FIG. 4 is a perspective view of the segment 116a. The upstream wall 96, the base 94, and the downstream wall 92 can be seen in the figure, as can the anti-rotation features 130. Also shown are the members 98. The anti-rotation features 130 can be formed in the base 94 between the cuts 118a, 118b, 118c, and 118d, or may bridge the cuts as can be seen in FIG. 4.

One aspect of the present application includes an adapter ring coupled with a support ring of a gas turbine engine. The adapter ring can be segmented into two or more pieces which may allow for assembly of the adapter ring within a confined space. In one form the adapter ring includes a radially oriented surface intended to support axial loads. The adapter ring may also include another radially oriented surface located upstream which, together with an extension between the two surfaces, may be used to receive at least a portion of a structural element such as a plug nozzle. In one form the plug nozzle and adapter ring may be made from different materials. In one embodiment, the adapter ring may be metallic and the plug nozzle may be a carbon-carbon composite.

One aspect of the present application includes an apparatus comprising a gas turbine engine adapter having an annular shape and including a fastener surface, a base, and a support surface, the base and the support surface operable to engagely support an at least partial circumferential surface of a gas turbine engine component, the support surface oriented at an angle relative to a centerline of the gas turbine engine, the fastener surface operable to engage with a gas turbine engine structure.

Another aspect of the present application includes an apparatus, comprising a gas turbine engine adapter having a circular shape and including several segments, at least one segment having a shape that extends less than half way around the circular shape of the gas turbine engine adapter, the gas turbine engine adapter also having a load bearing surface and a base, the load bearing surface following an annular contour and forming an angle relative to the base. Yet another aspect of the present application includes an apparatus comprising a gas turbine engine adapter releasably attachable to a gas turbine engine, the adapter having an annular shape and comprised of a first segment and a second segment of unequal sizes, wherein the adapter is formed of a first material and a load bearing support formed in the gas turbine engine adapter and operable to support a propulsion system structure formed of a second material.

Still another aspect of the present application includes an apparatus comprising a gas turbine engine support surface, a gas turbine engine propulsion system component, an adapter operable to engage the gas turbine engine support surface and the gas turbine engine propulsion system component, and means for accounting for thermal growth differences between the gas turbine propulsion component and the adapter.

Still a further aspect of the present application includes a method comprising forming an annular gas turbine engine adapter having a channel, the channel including a load bearing surface disposed at an angle relative to a center axis of the annular gas turbine engine adapter, sectioning the adapter into a first segment and a second segment, attaching the first segment to a gas turbine engine, and sliding the second segment into a final position from a starting position within an interior of the gas turbine engine.

A further aspect of the present application provides an apparatus comprising an aircraft engine having a plug nozzle, and a gas turbine engine adapter for coupling the aircraft engine with the plug nozzle and having an annular shape with a plurality of segments, at least one segment having an outer periphery that extends less than half way around the annular shape of the gas turbine engine adapter.

A still further aspect of the present application provides an apparatus comprising a gas turbine engine nozzle component having a portion formed of a first material, and a gas turbine engine adapter attachable to a gas turbine engine and having an annular shape that includes a first segment and a second segment of unequal sizes, wherein the adapter is formed of a second material.

A yet further aspect of the present application provides an apparatus comprising a gas turbine engine support surface, a gas turbine engine propulsion system component, an adapter operable to engage the gas turbine engine support surface and the gas turbine engine propulsion system component, and means for accounting for thermal growth differences between the gas turbine propulsion component and the adapter.

Yet another aspect of the present application provides a method comprising forming a plug nozzle multi-component adapter having an outer periphery and a hollow interior, the forming including attaching a first component of the plug nozzle multi-component adapter to a mounting structure of a gas turbine engine to form a partially completed adapter assembly, inserting a second component of the plug nozzle multi-component adapter into an installation space of the gas turbine engine, orienting the second component such that it may be radially slidingly received into an annular opening of the partially completed adapter assembly, and radially sliding the second component of the plug nozzle multi-component adapter into a coupled position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
an aircraft engine having a plug nozzle; and
a gas turbine engine adapter for coupling the aircraft engine with the plug nozzle and having an annular shape with a plurality of separate part segments, the gas turbine engine adapter including a radially inward receiving channel formed by an upstream wall, a downstream wall, and a base that axially extends between the upstream and downstream walls, at least one separate part segment having an outer periphery that extends less than half way around the annular shape of the gas turbine engine adapter;
wherein the plug nozzle includes an extension extending radially inward from a plug nozzle inner surface received by the radially inward receiving channel of the gas turbine engine adapter.

2. The apparatus of claim 1, wherein the gas turbine engine adapter also includes a load bearing surface and a base, the load bearing surface circumferentially extending around the gas turbine engine adapter and forming an angle relative to the base.

3. The apparatus of claim 2, a gap created to allow for thermal growth differences between the plug nozzle and the gas turbine engine adapter.

4. The apparatus of claim 1, wherein the gas turbine engine adapter includes four separate part segments, two of the four separate part segments having similar sizes.

5. The apparatus of claim 1, wherein the gas turbine engine adapter includes a keystone segment capable of being slidingly coupled with at least one other separate part segment.

6. The apparatus of claim 1, which further includes a gas turbine engine having a space that prevents the gas turbine engine adapter from being installed as a completed assembly, the space permitting the plurality of segments to be individually coupled with the gas turbine engine to form the gas turbine engine adapter.

7. The apparatus of claim 1, wherein the gas turbine engine adapter further includes anti-rotation feature engagable with a corresponding feature in the plug nozzle to discourage movement of the plug nozzle relative to the gas turbine engine adapter.

8. The apparatus of claim 7, wherein the anti-rotation feature bridges more than one separate part segment of the plurality of separate part segments.

9. The apparatus of claim 1, which further includes an adapter seal at least partially received within the adapter.

10. An apparatus, comprising:
a gas turbine engine nozzle component having a portion formed of a first material; and
a gas turbine engine adapter attachable to a gas turbine engine and having an annular shape that includes at least two segments including a first individual segment and a second individual segment of unequal sizes, wherein the adapter is formed of a second material;
wherein the first individual segment extends less than 180 degrees of the annular shape of the gas turbine engine adapter,
wherein the first and second individual segments have boundaries configured to enable the final first individual segment to be radially slidingly received into a final place from a radially interior starting position to form the completed annular shape of the gas turbine engine adapter;
wherein the gas turbine engine nozzle component is a plug nozzle, the plug nozzle includes a radially inward projecting extension, and the gas turbine engine adapter includes a channel defined by a radially extending upstream wall, a radially extending downstream wall, and a base that extends between the upstream and downstream walls, the channel sized to receive the radially inward projecting extension.

11. The apparatus of claim 10, which further includes a gas turbine engine having the gas turbine engine adapter.

12. The apparatus of claim 10, wherein the plug nozzle is a ceramic nozzle structure.

13. The apparatus of claim 10, wherein the gas turbine engine adapter includes a load bearing support operable to support the gas turbine engine nozzle component, the gas turbine engine adapter sized relative to the gas turbine engine nozzle component to allow for differences in thermal growth.

14. The apparatus of claim 13, wherein the adapter includes a channel operable to receive a circumferential surface of the propulsion system structure.

15. The apparatus of claim 10, which further includes means for sealing an interface between the adapter and the propulsion system structure.

16. A method, comprising:
forming a plug nozzle multi-component adapter having an outer periphery and a hollow interior, the forming including:
attaching a first discrete component of the plug nozzle multi-discrete-component adapter to a mounting structure of a gas turbine engine to form a partially completed adapter assembly;
inserting a second discrete component of the plug nozzle multi-discrete-component adapter into an installation space of the gas turbine engine that is radially interior of the partially completed adapter assembly, the second discrete component and the first discrete component having unequal sizes;
orienting the second discrete component such that it may be radially slidingly received from the installation space into an annular opening of the partially completed adapter assembly; and
radially sliding the second discrete component of the plug nozzle multi-component adapter into a coupled position to form the completed annular shape of the adapter assembly.

17. The method of claim 16, which further includes capturing an extension of a plug nozzle into a channel of the second discrete component such that the extension discourages axial movement of the second discrete component in at least one direction, the channel formed between an upright upstream wall, an upright downstream wall, and a base extending between the upstream and downstream walls.

18. The method of claim 16, which further includes installing a seal between the annular gas turbine engine adapter and a propulsion system structure.

19. The method of claim 16, which further includes aligning a register in the plug nozzle multi-discrete-component adapter with a complementary register in a portion of a plug nozzle structure such that the interaction of the register and registration surface discourage relative movement between the plug nozzle multi-discrete-component adapter and the plug nozzle structure.

* * * * *